(12) United States Patent
Gao et al.

(10) Patent No.: US 10,541,850 B2
(45) Date of Patent: Jan. 21, 2020

(54) SYSTEMS AND METHODS FOR WIRELESS COMMUNICATION WITH PER-BEAM SIGNAL SYNCHRONIZATION

(71) Applicant: SOUTHEAST UNIVERSITY, Nanjing (CN)

(72) Inventors: Xiqi Gao, Nanjing (CN); Li You, Nanjing (CN); Wenjin Wang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 35 days.

(21) Appl. No.: 15/744,909

(22) PCT Filed: Oct. 31, 2016

(86) PCT No.: PCT/CN2016/104104
§ 371 (c)(1),
(2) Date: Jan. 15, 2018

(87) PCT Pub. No.: WO2018/076362
PCT Pub. Date: May 3, 2018

(65) Prior Publication Data
US 2019/0013983 A1    Jan. 10, 2019

(51) Int. Cl.
*H04L 27/26* (2006.01)
*H04B 7/0408* (2017.01)
(Continued)

(52) U.S. Cl.
CPC ........... *H04L 27/2655* (2013.01); *H04B 7/01* (2013.01); *H04B 7/0408* (2013.01);
(Continued)

(58) Field of Classification Search
None
See application file for complete search history.

(56) References Cited

U.S. PATENT DOCUMENTS 9,479,240 B1 * 10/2016 Caire .................... H04B 7/024
9,780,856 B2 * 10/2017 Cai ...................... H04B 7/0617
(Continued)

OTHER PUBLICATIONS

U.S. Appl. No. 62/211,257, filed Aug. 28, 2015, "Beamformed Physical Downlink Control Channels in 5G RAT Beam Cell Operation", Jung et al., p. 1-26.*
(Continued)

*Primary Examiner* — Gregory B Sefcheck
(74) *Attorney, Agent, or Firm* — Metis IP LLC

(57) ABSTRACT

Signal transmitting/receiving electronic devices or terminals in the present disclosure are configured to conduct per-beam signal synchronization in massive MIMO communication with a signal receiving/transmitting device or base station. During the massive MIMO communication, the devices or terminals are configured to transmit/receive signals via a set of beams to or from the signal receiving/transmitting device or base station. For beam domain signal of each individual beam of the plurality beams, the devices or terminals are configured to determine target time adjustments based on time shifts of the beam domain signals induced by multipath effect and target frequency adjustments based on frequency offsets of the beam domain signals induced by the Doppler effect; adjust time independent variables of the beam domain signals by the time adjustments; and adjust frequency independent variables of the beam domain signals by the frequency adjustments. Further, per-beam synchronized BDMA massive MIMO transmission method is disclosed, which provides a solution to efficient and reliable wireless communications with high mobility and/or high carrier frequency.

34 Claims, 5 Drawing Sheets

(51) Int. Cl.
    *H04B 7/0413*     (2017.01)
    *H04B 7/06*     (2006.01)
    *H04W 56/00*     (2009.01)
    *H04B 7/01*     (2006.01)
    *H04L 5/00*     (2006.01)

(52) U.S. Cl.
    CPC ......... *H04B 7/0413* (2013.01); *H04B 7/0617* (2013.01); *H04L 5/0048* (2013.01); *H04W 56/005* (2013.01)

(56) References Cited

U.S. PATENT DOCUMENTS

| | | | | |
|---|---|---|---|---|
| 9,877,312 | B2 * | 1/2018 | Kim | H04W 72/042 |
| 9,894,658 | B2 * | 2/2018 | Gil | H04W 72/046 |
| 10,009,084 | B2 * | 6/2018 | Kim | H04B 7/0456 |
| 10,103,791 | B2 * | 10/2018 | Kwun | H04B 7/0691 |
| 10,165,544 | B2 * | 12/2018 | Hessler | H04W 56/00 |
| 10,178,560 | B2 * | 1/2019 | Black | H04B 7/0413 |
| 10,206,232 | B2 * | 2/2019 | Novlan | H04W 76/12 |
| 10,367,677 | B2 * | 7/2019 | Parkvall | H04L 41/0233 |
| 10,455,608 | B2 * | 10/2019 | Shepard | H04B 7/0452 |
| 2010/0165914 | A1 | 7/2010 | Cho et al. | |
| 2010/0215027 | A1 * | 8/2010 | Liu | H04B 7/0695 |
| | | | | 370/338 |
| 2012/0184311 | A1 * | 7/2012 | Yamamoto | H04W 56/002 |
| | | | | 455/502 |
| 2014/0003369 | A1 * | 1/2014 | Josiam | H04W 72/0406 |
| | | | | 370/329 |
| 2014/0073337 | A1 * | 3/2014 | Hong | H04W 16/28 |
| | | | | 455/452.1 |
| 2015/0334726 | A1 | 11/2015 | Gao et al. | |
| 2016/0218786 | A1 * | 7/2016 | Mizusawa | H04L 5/0023 |
| 2016/0352012 | A1 * | 12/2016 | Foo | H01Q 3/40 |
| 2016/0381596 | A1 * | 12/2016 | Hu | H04B 7/0617 |
| | | | | 370/236 |
| 2017/0215127 | A1 | 7/2017 | McGowan et al. | |
| 2017/0289822 | A1 * | 10/2017 | Hreha | H04W 16/28 |
| 2018/0006370 | A1 * | 1/2018 | Hreha | H01Q 3/2682 |
| 2018/0083719 | A1 * | 3/2018 | Kim | H04B 7/04 |
| 2018/0205436 | A1 * | 7/2018 | Gil | H04B 7/0617 |
| 2018/0254853 | A1 * | 9/2018 | Jung | H04L 1/0038 |
| 2018/0270844 | A1 * | 9/2018 | Kim | H04B 7/04 |
| 2018/0324730 | A1 * | 11/2018 | Lee | H04B 7/06 |
| 2019/0013983 | A1 * | 1/2019 | Gao | H04W 56/005 |
| 2019/0053286 | A1 * | 2/2019 | Cho | H04B 7/0408 |

OTHER PUBLICATIONS

International Search Report for PCT/CN2016/104104 dated Jul. 6, 2017, 4 pages.
Written Opinion of the International Search Authority for PCT/CN2016/104104 dated Jul. 6, 2017, 4 pages.

* cited by examiner

SYSTEMS AND METHODS FOR WIRELESS COMMUNICATION WITH PER-BEAM SIGNAL SYNCHRONIZATION

CROSS-REFERENCE TO RELATED APPLICATIONS

This application is a U.S. national stage under 35 U.S.C. § 371 of International Application No. PCT/CN2016/104104, filed on Oct. 31, 2016, designating the United States of America, the entire contents of which are incorporated herein by reference.

TECHNICAL FIELD

The present disclosure relates to a massive multiple-input multiple-output wireless transmission method using multiple antennas, specifically, to a per-beam synchronization method for wireless communications.

BACKGROUND

A mobile communication system is designed to achieve high communication efficiency with limited resources (e.g., frequency, time) via a multiple access technique. Currently, multiple access technologies are used during implementation of communication systems. Some multiple access technologies include: Frequency Division Multiple Access (FDMA), Time Division Multiple Access (TDMA), Code Division Multiple Access (CDMA), and Orthogonal Frequency Division Multiple Access (OFDMA).

Specifically, FDMA provides multiple access to user terminals by splitting frequency resources and allocating them to the user terminals. TDMA provides multiple access to use terminals by splitting time resources and allocating the generated time slots to the user terminals. CDMA provides user terminals with multiple access by allocating each user terminal an orthogonal code to eliminate mutual interference among user terminals. OFDMA provides multiple access to user terminals by splitting and allocating an orthogonal frequency resource. OFDM is a multi-carrier modulation technology suited for high data rate wideband wireless transmission.

Massive multiple-input multiple-output (MIMO) transmission employs a large number of antennas at the base stations to serve several user terminals simultaneously. With the potential large gains in spectral efficiency and energy efficiency, massive MIMO is a promising technology that future wireless systems may incorporate. Due to OFDM's robustness to channel frequency selectivity and relatively efficient implementation, OFDM combined with massive MIMO may be implemented in wideband massive MIMO transmission.

With severe spectrum shortage in the currently deployed cellular bands (sub-6 GHz) and the explosive wireless traffic demand, there is a growing consensus on utilizing higher frequency bands, for example, the millimeter-wave (mmW) band and the Terahertz (THz) band for future wireless communication systems. Combination of massive MIMO with mmW/THz technologies is appealing from a practical point of view. Orders-of-magnitude smaller wavelength in mmW/THz bands enables a larger number of antennas to be deployed at both the user terminals and base stations. Even for a high propagation path loss at mmW/THz channels, the achievable high beamforming gains with massive MIMO may help to compensate for it. Therefore, massive MIMO transmission over mmW/THz bands, which will be referred to as mmW/THz massive MIMO, is envisioned as a solution for future wireless communication systems.

Time and frequency synchronization of the transmission signals may be utilized to stabilize wireless transmission. One synchronization approach for MIMO-OFDM systems may be to compensate for the time/frequency offsets of the received signals in the antenna domain using the time/frequency adjustment parameters. In the scenarios such as high mobility and/or high carrier frequency (e.g., mmW/THz bands), the Doppler spreads of the wireless channels may be increased; meanwhile the channel delay spreads may not vary significantly. In OFDM systems, the cyclic prefix (CP) length may be set to be slightly larger than the delay spread to mitigate channel dispersion in time while the OFDM symbol length may be set to be inversely proportional to the Doppler spread to mitigate channel dispersion in frequency, which may lead to the wireless transmission system bottleneck.

Beamforming performed at the base stations and user terminals may divide the wireless channels in the space, and mitigate the fluctuation of envelopes of the beam domain channel elements. With this property, a per-beam time/frequency synchronization method for wireless transmission is proposed in the present disclosure.

SUMMARY OF THE INVENTION

According to an aspect of the present disclosure, a signal receiving electronic device may include a storage medium and a processor in communication with the storage medium. The storage medium may include a set of instructions for signal synchronization in massive MIMO wireless systems or beam division multiple access (BDMA) based massive MIMO wireless systems. When executing the set of instructions, the processor may be directed to conduct massive MIMO communication with a signal transmitting device. During the massive MIMO communication, the processor may be directed to: receive the signals, via a plurality of beams, from the signal transmitting device; for beam domain signal of each individual beam in the plurality of beams: determine a target time adjustment based on time shift of the beam domain signal when the beam domain signal was transmitted to the signal receiving device; determine a target frequency adjustment based on frequency offset of the beam domain signal when the beam domain signal was transmitted to the signal receiving device; adjust time independent variable of the beam domain signal by the time adjustment; and adjust frequency independent variable of the beam domain signal by the frequency adjustment.

According to another aspect of the present disclosure, a method for signal synchronization in massive MIMO or BDMA based massive MIMO may include, during massive MIMO communication between a signal transmitting device and a signal receiving device: receiving, by the signal receiving device, signals in a plurality of beams, from the signal transmitting device; for beam domain signal of each individual beam of the plurality of beams: determining, by the signal receiving device, a target time adjustment based on time shift of the beam domain signal when the beam domain signal was transmitted to the signal receiving device; determining, by the single receiving device, a target frequency adjustment based on frequency offset of the beam domain signal when the beam domain signal was transmitted to the signal receiving device; adjusting, by the signal receiving device, time independent variable of the beam domain signal by the time adjustment; and adjusting, by the signal receiving device, frequency independent variable of the beam domain signal by the frequency adjustment.

According to another aspect of the present disclosure, a signal transmitting electronic device may include a storage medium and a processor in communication with the storage medium. The storage medium may include a set of instructions for signal synchronization in massive MIMO or BDMA based massive MIMO. When executing the set of instructions, the processor may be directed to conduct massive MIMO communication with a signal transmitting device. During the massive MIMO communication, the processor may be directed to: determine a plurality of beams to transmit the signals to the signal receiving device; for beam domain signal of each individual beam of the plurality of beams: determine a target time adjustment based on time shift of the beam domain signal when the beam domain signal is transmitted to the signal receiving device; determine a target frequency adjustment based on frequency offset of the beam domain signal when the beam domain signal is transmitted to the signal receiving device; adjust time independent variable of the beam domain signal by the time adjustment; adjust frequency independent variable of the beam domain signal by the frequency adjustment; and send the beam domain signal to the signal receiving device.

According to another aspect of the present disclosure, a method for signal synchronization in massive MIMO or BDMA based massive MIMO may include, during massive MIMO communication between a signal transmitting device and a signal receiving device: determining, by the signal transmitting device, a plurality of beams to transmit signals to the signal receiving device; for beam domain signal of each individual beam of the plurality of beams: determining, by the signal transmitting device, a target time adjustment based on time shift of the beam domain signal that will be when the beam domain signal is transmitted to the signal receiving device; determining, by the signal transmitting device, a target frequency adjustment based on frequency offset of the beam domain signal that will be when the beam domain signal is transmitted to the signal receiving device; adjusting, by the signal transmitting device, time independent variable of the beam domain signal by the time adjustment; adjusting, by the signal transmitting device, frequency independent variable of the beam domain signal by the frequency adjustment; and sending, by the signal transmitting device, the beam domain signal to the signal receiving device.

According to yet another aspect of the present disclosure, a method for BDMA based massive MIMO transmission with per-beam synchronization may comprise: both the base stations and user terminals are equipped with large antenna arrays; signal synchronization in BDMA is performed over each beam individually in beam sets of user terminals; base stations perform beam and user scheduling to select the user terminals that communicate with the base station over the same time/frequency resources and the corresponding transmit and receive beams for each user terminal based on the beam domain channel statistics; the base station beam sets assigned to different scheduled user terminals are mutually non-overlapping; In downlink BDMA transmission, base stations transmit the pilot signals and data signals over the assigned beams for each scheduled user terminal; each scheduled user terminal applies per-beam synchronization to the received signal over the receive beams; pilot signals are not required to be orthogonal for different user terminals, and may be reused across different user terminals; In uplink BDMA transmission, the scheduled user terminals apply per-beam time and frequency synchronization to the transmit pilot and data signals over the transmit beams; base stations process the signals over the assigned receive beams; pilot signals sent from different user terminals are not required to be orthogonal, and may be reused across different user terminals; the BDMA massive MIMO wireless transmission may be dynamically adjusted when the statistics of the channels between the base stations and the user terminals vary.

BRIEF DESCRIPTION OF THE DRAWINGS

The described systems and methods may better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals may designate corresponding parts.

DETAILED DESCRIPTION

Figure 1:
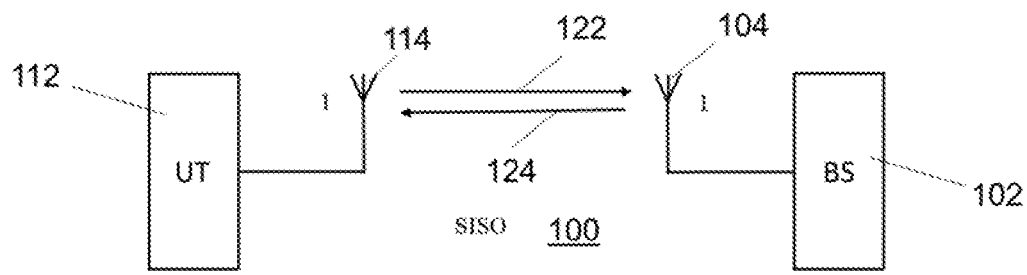
FIG. 1 illustrates a single input single output system according to some embodiments of the present disclosure.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

It will be understood that when a module or unit is referred to as being "on", "connected to" or "coupled to" another module or unit, it may be directly on, connected or coupled to the other module or unit or intervening module or unit may be present. In contrast, when a module or unit is referred to as being "directly on," "directly connected to" or "directly coupled to" another module or unit, there may be no intervening module or unit present. As used herein, the term "and/or" includes any and all combinations of one or more of the associated listed items.

The terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

With serve spectrum shortage in currently deployed cellular bands and the explosive wireless traffic demand, increasing attention has been paid on utilizing higher frequency bands, for example, the millimeter-wave (mmW) band and the Terahertz (THz) band, for future wireless communication. Massive MIMO transmission deploys large numbers of antennas at the base stations (BSs) to simultaneously serve multiple user terminals (UTs) and may significantly improve the system spectrum efficiency. Combination of massive MIMO with mmW/THz technologies is appealing from a practical point of view. Orders-of-magnitude smaller wavelength in mmW/THz bands enables a larger number of antennas to be deployed at both the user terminals and base stations. Even for a high propagation path loss at mmW/THz channels, the achievable high beamforming gains with massive MIMO may help to compensate for it. Therefore, massive MIMO transmission over mmW/THz bands, which may be referred to mmW/THz massive MIMO, is envisioned as a promising solution for future cellular wireless.

One challenge in realizing transmission over mmW/THz channels is to support user terminals with high mobility, especially in non-line-of-sight propagation environments. Consider wide-band mmW/THz transmission employing OFDM modulation for example. With perfect time/frequency synchronization in the space domain, the cyclic prefix (CP) duration is usually set to be slightly larger than the delay spread to mitigate channel dispersion in time while the OFDM symbol duration is usually set to be inversely proportional to the Doppler spread to mitigate channel dispersion in frequency. Since the Doppler spread of mmW/THz channels is order-of-magnitude larger than that of classical wireless channels for the same mobile speed, the OFDM symbol duration in mmW/THz transmission will be substantially shorter. As a result, the overhead of the CP will be much larger to deal with the same delay spread.

To solve this problem, the present disclosure provides methods for per-beam synchronization, where signals over each beam of the user terminals may be synchronized individually. As a result, both the effective channel delay and Doppler frequency spreads may be approximately reduced by a factor of the number of user terminal antennas in the large array regime with per-beam synchronization compared with conventional synchronization approaches, which may effectively mitigate the severe Doppler effect in mmW/THz systems and leads to a significantly reduced CP overhead. To this end, the present disclosure may adopt a massive MIMO to support high mobility user terminals over mmW/THz channels. For example, exemplary embodiments in the present disclosure may apply pre-beam synchronization to beam division multiple access (BDMA) for mmW/THz massive MIMO-OFDM transmission.

For signal transmission in either uplink (UL) or downlink (DL), there may have a need of time/frequency synchronization for the BS and/or UT to receive the signal with zero or less error. The time/frequency synchronization need may be caused by the delay or delay spread. Delays in time may correspond to the transmission time of signals between the base stations and user terminals. The frequency synchronization need may derive from the motion of the user terminal. When a user terminal is moving, a Doppler frequency shift or Doppler frequency spread may be induced.

FIG. 1 is a block diagram showing a wireless communication system utilizing a single-input single-output (SISO) network 100. The SISO network 100 may include a BS/transmitter 102 and a receiver/UT 112. The BS/transmitter 102 may operate with one antenna 104, and the receiver/UT may operate with one antenna 114. Through the antennas 104 and 114, the BS/transmitter 102 and the receiver/UT may establish an SISO communication 122 and 124. There is no diversity and no additional processing required. When the UT 112 receives a signal from the BS 102, it may only need to compensate the delay of transmission path 122, 124 for synchronization. The disadvantage of this SISO transmission scheme may be that the channel bandwidth is limited by Shannon's law—the throughput being dependent upon the channel bandwidth and the signal to noise ratio.

To solve a problem of severe spectrum shortage in the currently deployed cellular bands and the explosive wireless traffic demand, the development of mobile network technology is facing a growing consensus on utilizing higher frequency bands, for example, the mmW band and the THz band for future cellular wireless. At the same time, orders-of-magnitude smaller wavelength in mmW/THz bands enables a larger number of antennas to be deployed at both the user terminals and base stations.

Figure 2:
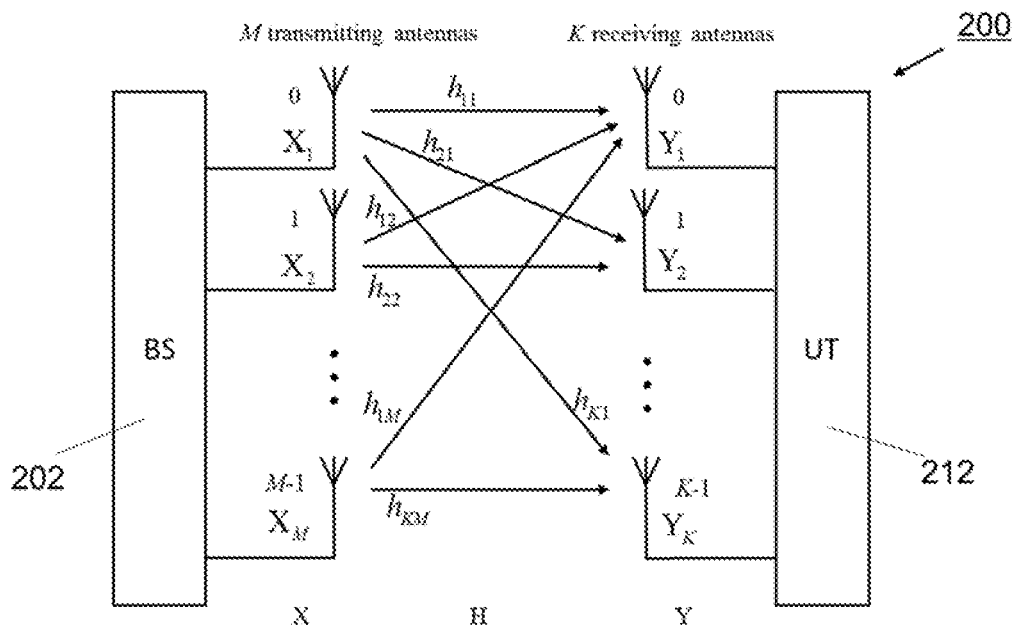
FIG. 2 illustrates a multiple input multiple output system according to some embodiments of the present disclosure.

FIG. 2 illustrates an MIMO wireless communication system 200 according to some embodiments of the present disclosure. The MIMO system 200 may include one or more BSs 202 and one or more UTs 212.

For illustration purpose only, FIG. 2 only shows one BS 202 and one UT 212. The BS 202 may be equipped with an antenna array involving several or several dozens of antennas. The equipped antenna array may be linear array, circular array or planar array, etc. For example, the BS 202 may include M antennas $X_1, X_2, \ldots, X_M$. The antennas may be omnidirectional antennas or directional antennas. When the antenna array utilizes omnidirectional antennas, 120 degree directional antennas, or 60 degree directional antennas, the corresponding antenna spacing may respectively be ½ wavelength, $1/\sqrt{3}$ wavelength, or 1 wavelength. The antennas may be single-polarized or multi-polarized antennas.

Each antenna in the antenna array may connect with one or more digital baseband modules through respective transmit/receive radio frequency (RF) modules, AD/DA modules, digital optical modules, and fiber optic transmission channels (not shown). Accordingly, the BS may achieve cell coverage by massive beams using one or more digital or analog or hybrid beamforming networks. Each beam transmit/receive port may be connected with the one or more digital baseband modules through the respective transmit/receive RF modules, AD/DA modules, digital optical modules, and fiber optic transmission channels.

The BS 202 may establish wireless communications with one or more UTs 212. For example, the number of UTs 212 communicated with the BS 202 may be U, and accordingly the set of user terminals may be denoted as $U=\{0, 1, \ldots, U-1\}$. Each UT 212 may be equipped with an antenna array. In FIG. 2, the antenna array may include K antennas $Y_1, Y_2, \ldots Y_K$. The antennas may be omnidirectional antennas or directional antennas. When the antenna array utilizes omnidirectional antennas, 120 degree directional antennas, or 60 degree directional antennas, the corresponding antenna spacing may respectively be ½ wavelength, $1/\sqrt{3}$ wavelength, or 1 wavelength. The antennas may be single-polarized or multi-polarized. According to exemplary embodiments of the present disclosure, cyclic prefix (CP) based OFDM may be adopted for wideband modulation.

The antennas in FIG. 2 may serve as transmitting antennas or receiving antennas or both. For example, during wireless communication, the antennas in BS 202 may serve as transmitting antennas and the antennas in UT 212 may serve as receiving antennas, or vice versa. The transmitting antennas and receiving antennas may undertake a massive MIMO transmission with large M and/or K, wherein $h_{ij}$(i=1, 2, ..., K; j=1, 2, ..., M) denotes the channel coefficient between the jth transmit antenna and the ith receive antenna.

Taking a single-cell massive MIMO system as an example, where the BS with M antennas simultaneously serves UTs, each with K antennas. The UT set is denoted as U={0, 1, ..., U−1} where u∈U denotes the UT index. As illustrated in FIG. 2, a moving UT 212 with K antennas $Y_1$, $Y_2$, ..., $Y_K$ may communicate with a BS 202 through the massive MIMO channel. During the transmission of signals to an antenna, such as antenna 0 (i.e., $Y_1$) in the UT 212, from any one of the antennas 0~M−1 (i.e., $X_1$, $X_2$, ..., $X_M$) in the BS 202, the signals in the wireless channels may undergo attenuations, AoA (Angle of Arrival), AoD (Angle of Departure), delays, Doppler shifts, or the like, or any combination thereof. The diversity of the delays/Doppler shifts may be called delay spread/Doppler spread. The delay spread may be a measure of the multipath richness of a communications channel. In general, it may be interpreted as the difference between the time of arrival of the earliest significant multipath component (typically the line-of-sight component) and the time of arrival of the latest multipath components. Signals traveling along different transmission paths may have different Doppler shifts, corresponding to different rates of change in frequency/phase. The different Doppler shifts may derive from different signal transmission paths to an antenna of the user terminal.

Figure 3:
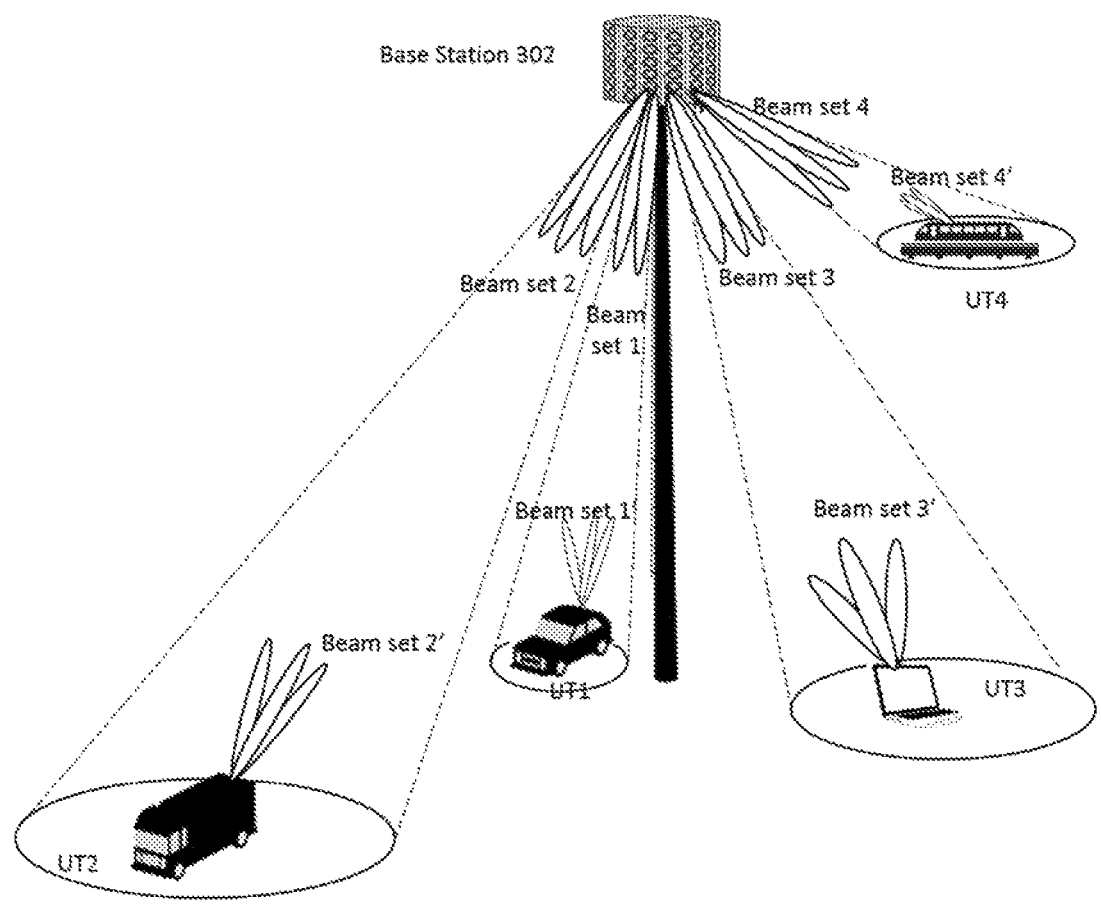
FIG. 3 illustrates an implementation of beam domain multiple access according to some embodiments of the present disclosure.

FIG. 3 illustrates a system environment of a BDMA technique according to some embodiments of the present disclosure. The system may include at least one base station 302 and at least one user terminal UT1~UT4. Both the base station 302 and user terminals UT1~UT4 may be equipped with multiple or massive antennas, and the number of equipped antennas for the base station 302 and/or the user terminals UT1~UT4 may be anywhere from several to several dozen or more. The antenna spacing in the base station 302 and/or the user terminal UT1~UT4 may be no less than one-half wavelength. The equipped antennas may be single-polarized or multi-polarized.

Communications between the base station 302 and user terminals UT1~UT4 may be performed in the beam domain via beamforming; beamforming performed at both the base station 302 and the user terminals UT1~UT4 may divide the channels in the space. The base station 302 and user terminals UT1~UT4 may perform beamforming via analog beamforming networks or digital beamforming networks or hybrid beamforming networks to divide the channels in the space, and to mitigate the fluctuation of the envelopes of the beam domain channel elements. Further, the numbers of beams formed at the base station 302 and the user terminals UT1~UT4 may be anywhere from several to several dozen or more.

The base station 302 may transmit signals over different beam sets to serve simultaneously multiple user terminals (UTs). In some embodiments, the base station 302 may transmit signals over different beam sets to serve simultaneously multiple user terminals (UTs) in the same time/frequency resources. Likewise, user terminals UT1~UT4 may transmit signals over different beam sets to the base station 302. User terminals UT1~UT4 may transmit signals over different beam sets to the base station 302 in the same time/frequency resources. In some embodiments, a user terminal may use a beam set exclusively. For example, user terminal UT1 may communicate with the base station 302 via beam set 1 of base station 302 and beam set 1' of UT 1, and user terminal 4 may communicate with the base station 302 via beam set 4 of base station 302 and beam set 4' of UT 4. In some embodiments, multiple user terminals may share a beam to communicate with the base station 302 via different time/frequency resources.

The base station 302 may perform beam and user scheduling to select the user terminals UT1~UT4 that communicate with the base station 302 over the same time/frequency resources and the corresponding transmit and receive beams of each user terminal based on the beam domain channel statistics. For example, the base station 302 may perform beam and user scheduling based on the beam domain channel statistics. The beam domain channel statistics may be estimated during an uplink channel sounding procedure. To this end, each user terminal may periodically send uplink sounding signals. The base station 302 may estimate the beam domain channel statistics based on the received uplink channel sounding signals, and utilize them to conduct user and beam scheduling. The base station beam sets assigned to different scheduled user terminals in BDMA may be mutually non-overlapping. The user and beam scheduling may be performed via greedy algorithms.

It should be noted that the above description of the implementation is merely provided for the purposes of illustration, and not intended to limit the scope of the present disclosure. For persons having ordinary skills in the art, multiple variations or modifications may be made under the teachings of the present disclosure. For example, the number of user terminals may be larger than 4. In some embodiments, the number of user terminals may be tens or hundreds. However, those variations and modifications do not depart from the scope of the present disclosure.

In a DL BDMA transmission, the base station 302 may transmit synchronization signals in the beam domain. The DL transmission may include pilot training and data transmission. The base station 302 may send pilot signals for one or more scheduled terminals over the scheduled beams. The base station 302 may transmit the signals over the scheduled beams for the scheduled user terminals over the same resource blocks simultaneously. The pilot signals for different user terminals may not necessarily be mutually orthogonal and may be reused across different user terminals. The pilot signals of the same user terminal over different transmit beams may be mutually orthogonal. Each user terminal may estimate an instantaneous channel state information and interference covariance matrices based on the received pilot signals and the data signals over the scheduled receive beams, and then utilize them to perform coherent detection of the downlink data signals. Each individual user terminal may apply time and frequency synchronization to the received signals based on the estimated time and frequency adjustment parameters over each individual receive beam.

In an UL BDMA transmission, each user terminal may transmit the signals over the scheduled beams over the same resource blocks simultaneously. The UL transmission may include pilot training and data transmission. When user terminals send the pilot signals over the scheduled beams, the pilot signals for different user terminals may not necessarily be mutually orthogonal and may be reused across different user terminals. The pilot signals of the same user terminal over different transmit beams may be mutually orthogonal. The base station 302 may estimate an instantaneous channel state information and interference covariance matrices based on the received pilot signals and the data signals over the scheduled receive beams of each user terminal, and then utilize them to perform coherent detection of the uplink data signals. The user terminals may apply time and frequency synchronization to the transmit signals based on the estimates of the time and frequency adjustment parameters over each transmit beam individually. The base station 302 may process the signals over the assigned receive beams.

The BDMA based massive MIMO wireless transmission described above may be dynamically adjusted when the statistics of the channels between the base station 302 and the user terminals vary.

The BDMA technique of the present disclosure divides the available beam resources to allow the user terminals to achieve multiple access, thereby significantly increasing the capacity of the system.

The BDMA may be embodied by generating beams through beamforming using a phase array antenna. User terminals sharing the same beams may achieve multiple access by applying other multiple access techniques such as TDMA, CDMA, or OFDMA.

Figure 4:
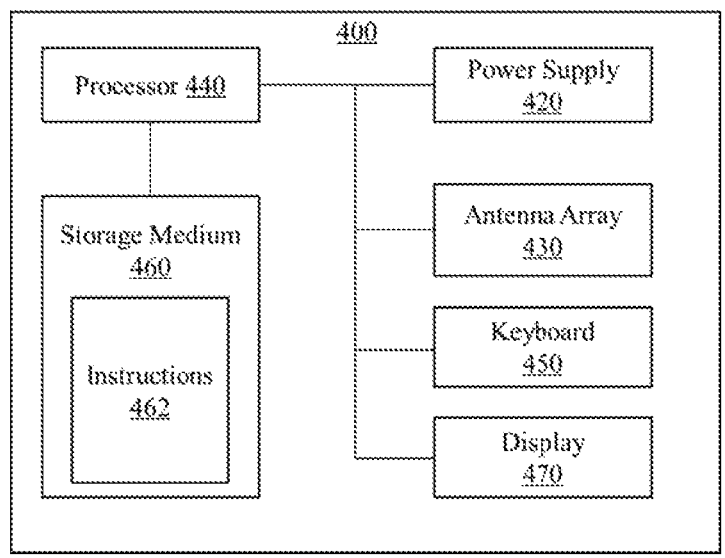
FIG. 4 illustrates a block diagram of a user terminal according to some embodiments of the present disclosure.

FIG. 4 illustrates a block diagram of a user terminal 400 according to some embodiments of the present disclosure. The user terminal 400 may be a user terminal in the system shown in FIG. 3. For example, the user terminal 400 may be a mobile phone, a tablet computer, a wireless communication station mounted on a moving vehicle, or any type of electronic user devices available in market at the filing time of this application. The user device may include a processor 440 as well as one or more transitory and non-transitory storage media 460, such as memory, RAM, and ROM, etc. The storage media 460 may include a set of instructions 462 to implement methods introduced in the present disclosure. The processor 440 may communicate with the storage media 460 and execute the set of instructions 462 to perform the implemented methods.

The client device 400 may vary in terms of capabilities or features. Claimed subject matter is intended to cover a wide range of potential variations. For example, the client device 400 may include a keypad/keyboard 450. For another example, the client device 400 may include a power supply 420. It may also include a display 470, such as a liquid crystal display (LCD), or a display with a high degree of functionality, such as a touch-sensitive color 2D or 3D display. In contrast, however, as another example, a web-enabled client device 400 may include one or more physical or virtual keyboards.

The client device 400 may also include or may execute a variety of operating systems, including an operating system, such as a Windows™ or Linux™, or a mobile operating system, such as iOS™, Android™, or Windows Mobile™. The client device 400 may include or may execute a variety of possible applications. An application (not shown) may enable communications with other devices via a network, such as communicating with another computer or base station via antenna array 430.

The antenna array 430 may be configured to generate signals via one or more beams. The antenna array 430 may also be configured to receive signals via one or more beams, either from a base station or from other user terminals. Processor 440 may further be configured to execute the instructions to process signals received by the antenna array 430.

Merely for illustration, only one processor will be described in user terminals that execute operations and/or method steps in the following exemplary embodiments. However, it should be note that the user terminals in the present disclosure may also include multiple processors, thus operations and/or method steps that are performed by one processor as described in the present disclosure may also be jointly or separately performed by the multiple processors. For example, if in the present disclosure a processor of a user terminal executes both step A and step B, it should be understood that step A and step B may also be performed by two different processors jointly or separately in the user terminal (e.g., the first processor executes step A and the second processor executes step B, or the first and second processors jointly execute steps A and B).

Figure 5:
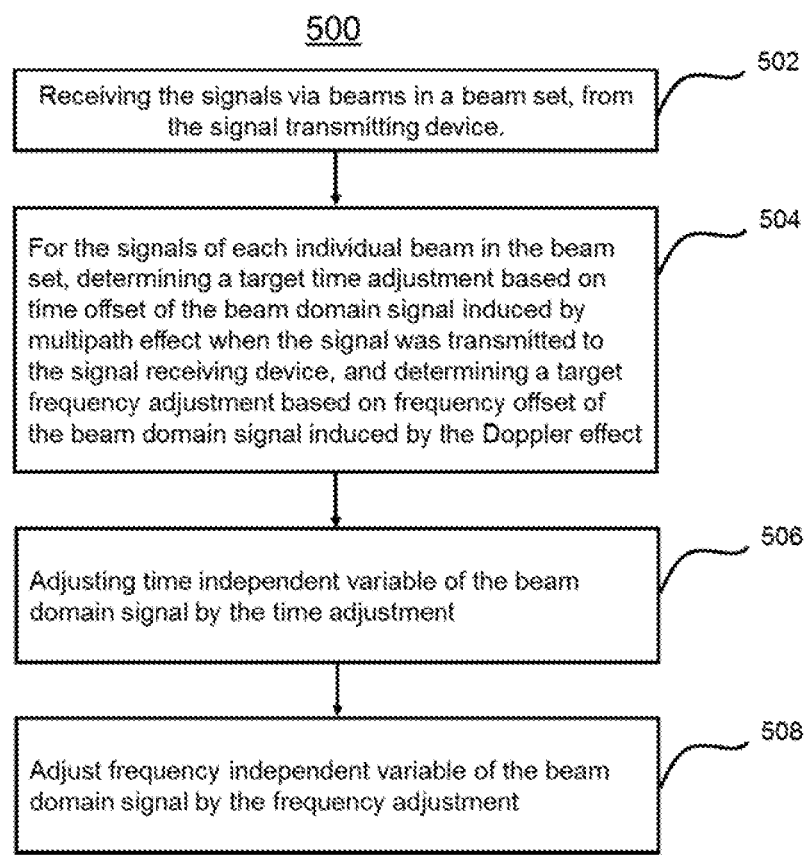
FIG. 5 is a flowchart illustrating a method for signal synchronization according to some embodiments of the present disclosure.

FIG. 5 is a flowchart illustrating a method 500 for signal synchronization according to some embodiments of the present disclosure. The method 500 may be implemented in an electronic device, such as a user terminal 400, serving as a signal receiving device during DL transmission. For example, the signal receiving device may include a processor and a storage medium, such as ROM, RAM, or hard disk. The storage medium may include a set of instructions or an application for the signal synchronization in wireless communications. The processor may be in communication with the storage medium to execute the set of instructions or applications. When executing the set of instructions, the processor may be directed to conduct massive multiple input multiple output (MIMO) communication with a signal transmitting device, such as a base station or another electronic device.

In Step 502, receiving the signals via beams in a beam set, from the signal transmitting device.

In a massive MIMO scenario, both the signal transmitting device and signal receiving device may be electronic devices including multiple antennas. For example, the signal receiving device may be a user terminal, such as a mobile phone, which may include 8, 64, 128, or 256 antennas. The signal transmitting device may be a base station, which may include 64, 128, or 256 antennas, or maybe another user terminal that is communicating with the user terminal via wireless network connection, such as cellular network, Wi-Fi, or hotspot connection. Both the base station and user terminal may be equipped with antenna arrays and the numbers of equipped antennas may be several to several dozen or more. The equipped antennas may be single-polarized or multi-polarized, and the antenna spacing may be no less than one-half wavelength.

In order to receive the signals from the signal transmitting device, the signal receiving device may first establish a wireless communication with the signal transmitting device. For example, the communication may be performed in the beam domain via beamforming. The communication may be conducted through one or more communication channels. Beamforming performed at both the signal transmitting device and the single receiving device may divide the one or more communication channels in the space, and mitigate the fluctuation of the envelopes of the beam domain channels. The signal transmitting device and the signal receiving device may perform beamforming via analog beamforming networks or digital beamforming or hybrid beamforming to divide the channels in the space, and to mitigate the fluctuation of the envelopes of the beam domain channel elements.

To achieve massive MIMO communication, the signal transmitting device may send out over a carrier frequency to the signal receiving device through the multiple antennas thereon, as shown in FIG. 2. The beam domain signals of the beam set may be received by the signal receiving device. As introduced above, for 5G telecommunication, the predetermined carrier frequency may be in the range of millimeter-wave (mmW) and/or the Terahertz (THz) bands. The numbers of beams formed in the signal transmitting device and the signal receiving device may vary from several to several dozen or more.

In some embodiments, the received signal may exhibit time spread and frequency spread with respect to the signals of the plurality of beams sent out by the signal transmitting device. For example, when the signal transmitting device and the signal receiving device have relative motion with respect to each other, Doppler effect may occur to the signals of the beams sent out from the signal transmitting device. As a result, the received signal may exhibit time spread and frequency spread with respect to the signal sent out by the signal transmitting device. The time spread and frequency spread may depend on the propagation environment as well as the relative speed of the signal transmitting device and signal receiving device.

To offset the Doppler effect on the signals of each of the plurality of beams, the signal receiving device may individually synchronize each of the at least one beam in the beam set. For example, in a DL BDMA transmission, each user terminal may estimate the time and frequency adjustment parameters of the transmission signals over each beam individually based on the received synchronization signals sent from the base station. Based on the estimated time and frequency adjustment parameters over each receive beam, the user terminal may apply the time and frequency synchronization to the received signals individually. To this end, the processor of the signal receiving device may execute the set of instructions stored in its storage medium to perform the following steps.

In Step 504, for beam domain signal of each individual beam of the plurality of beams, determining a target time adjustment; and determining a target frequency adjustment.

The signal receiving device may be able to calculate and/or determine the degree of the multipath effect and the Doppler effect with respect to the signals of each of the plurality of beams. For example, the signal receiving device may calculate and/or determine the time shift and frequency spread induced by the multipath effect and the Doppler effect on the signals of each beam, and then based on the time shift and frequency spread determine the target time adjustment and target frequency adjustment needed for the signals of the beam in order to mitigate the multipath effect and the Doppler effect.

For example, during the wireless communication, information may be transmitted as a plurality of packages of signals from the signal transmitting device to the signal receiving device. Accordingly, the signals received via beams by the signal receiving device may include a plurality of transmission blocks. The signal receiving device may determine and collect the time shift of every single transmission block. Then the signal receiving device may select a reference value between the minimum time shift and maximum time shift and take the reference value as the target time adjustment. In some embodiments of the present disclosure, for example, the signal receiving device may select the minimum time shift as the target time adjustment.

As to the frequency spread, for each of the plurality of transmission blocks, the signal receiving device may determine the frequency spread, induced for example by the Doppler effect, and then determine the minimum frequency offset and the maximum frequency offset from the frequency spread, and then take the two frequency offsets as the minimum candidate frequency adjustment and maximum candidate frequency adjustment, respectively. The signal receiving device may then place the two candidate frequency adjustments of all of the plurality of transmission blocks together, and determine, respectively therefrom, an upper bound value and a lower bound value. Finally, the signal receiving device may select a value between the upper bound value and the lower bound value, and take the selected value as the target frequency adjustment. For example, the target frequency adjustment may be selected as the mid-value of the upper bound value and lower bound value, the upper bound value, the lower bound value, or any value between the upper bound value and the lower bound value.

In Step 506, individually adjusting time independent variable of the beam domain signal of each beam by the time adjustment.

In Step 508, individually adjusting frequency independent variable of the beam domain signal of each beam by the frequency adjustment.

To substantially correct the time shift of each of a received beam domain signal, the signal receiving device may apply the target time adjustment with respect to the received beam domain signal on the time variable of the received beam domain signal. Similarly, to substantially correct the frequency spread of the received beam domain signal, the signal receiving device may apply the target frequency adjustment with respect to the received beam domain signal on the frequency variable of the received beam domain signal. The signal receiving device may individually offset and/or adjust the time shift and frequency spread of each of the beam domain signals in the beam set. Consequently, the resultant beam domain signals may be substantially close to the original beam domain signals sent from the signal transmitting device in the sense of reduced multipath and Doppler effects.

In some embodiments, the signal receiving device may dynamically adjust the above described massive MIMO wireless transmission when the statistics of the channels between base stations and user terminals vary.

Figure 6:
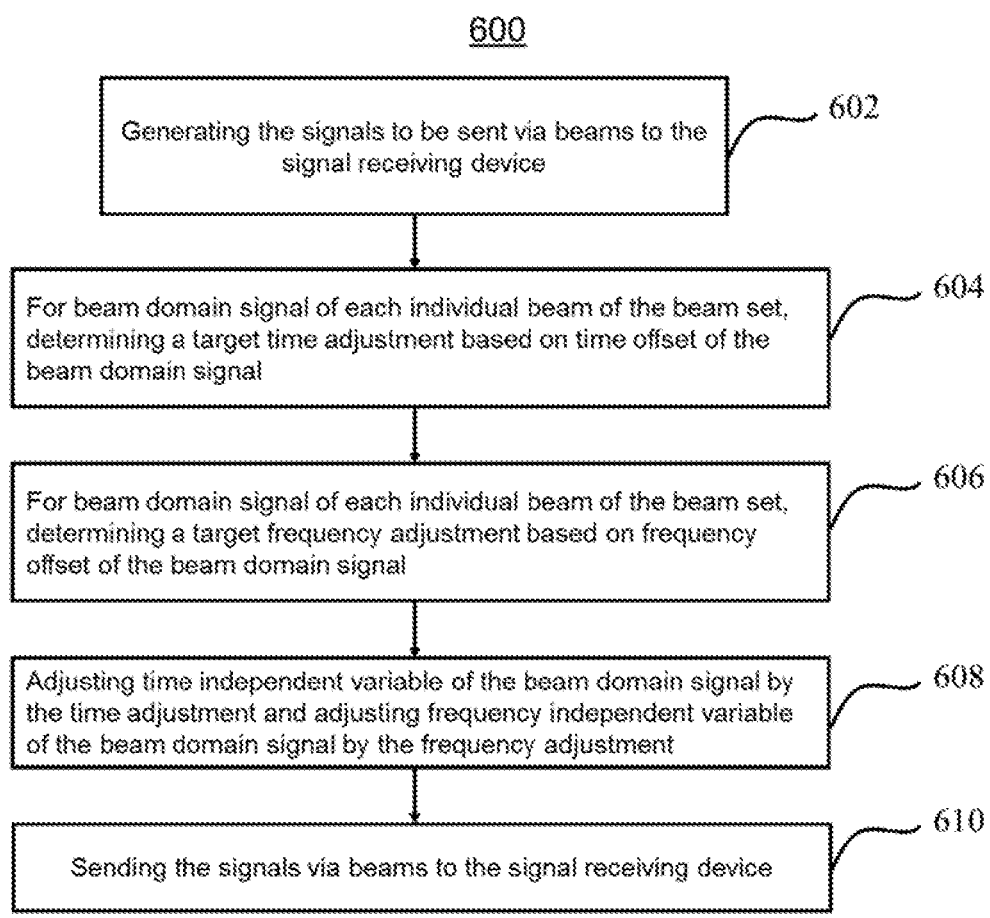
FIG. 6 is a flowchart illustrating a method for signal synchronization according to some embodiments of the present disclosure.

FIG. 6 is a flowchart illustrating a method 600 for signal synchronization in BDMA based massive MIMO or other massive MIMO communications according to some embodiments of the present disclosure. The method 600 may be implemented in an electronic device, such as a user terminal 400, serving as a signal transmitting device during UL transmission. For example, the signal transmitting device may include a processor and a storage medium, such as ROM, RAM, or hard disk. The storage medium may include a set of instructions or an application for the signal synchronization in BDMA. The processor may be in communication with the storage medium to execute the set of instructions or application. When executing the set of instructions, the processor may be directed to conduct massive MIMO communication with a signal receiving device, such as a base station or another electronic device.

In Step 602, generating the signals to be sent via beams to the signal receiving device.

In a massive MIMO scenario, both the signal transmitting device and signal receiving device may include multiple antennas arranged with half-wavelength interval. For example, during the UL communication, the signal transmitting device may be a user terminal, such as a mobile phone, which may include 8, 64, 128, or 256 antennas. The signal receiving device may be a base station, which may include 64, 128, or 256 antennas or maybe another user terminal that is communicating with the user terminal via wireless network connection, such as cellular network, Wi-Fi, or hotspot connection. Both the base station and user terminal may be equipped with antenna arrays and the numbers of equipped antennas may be several to several dozen or more. The equipped antennas may be single-polarized or multi-polarized, and the antenna spacing may be no less than one-half wavelength.

In order to transmit a signal to the signal receiving device, the signal transmitting device may first establish a wireless communication with the signal receiving device. For example, the communication may be performed in the beam domain via beamforming. The communication may be conducted through one or more communication channels. Beamforming performed at both the signal transmitting device and the single receiving device may divide the one or more communication channels in the space, and mitigate the fluctuation of the envelopes of the beam domain channels. The signal transmitting device and the signal receiving device may perform beamforming via analog beamforming networks or digital beamforming or hybrid beamforming to divide the channels in the space, and to mitigate the fluctuation of the envelopes of the beam domain channel elements.

To achieve massive MIMO communication, the signal transmitting device may send out signals via a plurality of beams using the same time/frequency resources to the signal receiving device through the multiple antennas thereon, as shown in FIG. 2. The signal over the beams of the beam set may be received by the multiple antennas of the signal receiving device. As introduced above, for 5G telecommunication, the predetermined frequency of the beam may be in the range of millimeter-wave (mmW) and/or the Terahertz (THz) bands. The numbers of beams formed in the signal transmitting device and the signal receiving device may vary from several to several dozen or more.

In the UL communication scenario, since the signal receiving device (e.g., the base station) may communicate with multiple signal transmitting devices (e.g., the user terminals) located at different places and moving at various velocities, it may be more convenient for the signal transmitting device to determine its own the time shift and frequency shift that the multipath effect and the Doppler effect will induce to the UL transmission beam domain signal.

Further, beam domain signals may be transmitted to the signal receiving device via different paths and/or route. Accordingly, the time shift and frequency spread for the beam domain signal of each beam received by the signal receiving device may be different. Therefore, the signal transmitting device may determine the multipath effect and the Doppler effect on a per beam basis.

In Step 604, for beam domain signal of each individual beam of the beam set, determining a target time adjustment based on time shift of the beam domain signal that will be induced by multipath effect when the signal of the beams in the beam set is transmitted to the signal receiving device.

In Step 606, for beam domain signal of each individual beam of the beam set, the signal transmitting device determines a target frequency adjustment based on frequency offset of the beam domain signal that will be induced by the Doppler effect when the signal of the beams in the beam set is transmitted to the signal receiving device.

As introduced above, the beam domain signal of each beam may include a plurality of transmission blocks. When the relative velocity and position between the signal transmitting device and the signal receiving device is known, the signal receiving device may be able to estimate and/or determine the degree of the multipath effect and the Doppler effect. For example, the signal transmitting device may calculate and/or determine the time shift and frequency spread induced by the multipath effect and the Doppler effect for each transmission block, and then may determine the target time adjustment and target frequency adjustment based on the time shift and frequency spread.

For example, the signal transmitting device may determine and collect the time shift (maximum value and minimum value) of every single transmission block, and then determine the minimum time shift and maximum time shift among the plurality of transmission blocks. Then the signal transmitting device may select a reference value between the minimum time shift and maximum time shift and take the reference value as the target time adjustment. In some embodiments of the present disclosure, for example, the signal transmitting device may select the minimum time shift as the target time adjustment. Alternatively, the signal transmitting device may select the maximum time shift as the target time adjustment or a mid-value between the minimum and maximum time shift as the target time adjustment.

As to the frequency spread, for each of the transmission block, the signal transmitting device may estimate and/or determine the frequency spread induced by the Doppler effect to each individual beam domain signal, and then determine the minimum frequency offset and the maximum frequency offset from the frequency spread, and then take the two frequency offsets as the minimum candidate frequency adjustment and maximum candidate frequency adjustment, respectively. The signal transmitting device may then place the two candidate frequency adjustments of all of the plurality of transmission blocks together, and determine, respectively therefrom, an upper bound value and lower bound value. Finally, the signal transmitting device may select a value between the upper bound value and lower bound value, and take the selected value as the target frequency adjustment. For example, the target frequency adjustment may be the mid-value of the upper bound value and lower bound value. Alternatively, the target frequency adjustment may be selected as the upper bound value, lower bound value, or any other value therebetween.

In Step 608, adjusting time independent variable of the individual beam domain signal by the target time adjustment and adjusting frequency independent variable of the individual beam domain signal by the target frequency adjustment.

To substantially correct the frequency spread and time shift, the signal transmitting device may respectively apply the target time adjustment and frequency adjustment in the time variable and frequency variable of the to-be-sent beam domain signals, so that when the signal arrives at the signal receiving device, the resultant beam domain signal may be substantially close to the original beam domain signal that should have been sent from the signal transmitting device in the sense of reduced multipath and Doppler effects.

In Step 610, the signal transmitting device sends the signals via beams in the beam set to the signal receiving device.

In some embodiments, a BDMA based massive MIMO transmission method with per-beam time/frequency synchronization may be implemented as follows:

a. Both the base stations and user terminals are equipped with large antenna arrays where the numbers of array antennas are several to several dozen or more.

b. BDMA based wireless transmission may be performed in the beam domain; beamforming performed at both the base stations and the user terminals divides the channels in the space, and mitigates the fluctuation of the envelopes of the beam domain channel elements; the numbers of beams formed at the base stations and the user terminals may be several to several dozen or more.

c. Synchronization of the transmission signals in BDMA is performed over each beam individually in beam sets of user terminals; each user terminal estimates the time and frequency adjustment parameters of the signals over each beam individually based on the received synchronization signals sent from the base stations.

d. In downlink BDMA transmission, user terminals apply time and frequency synchronization to the received signals based on the estimates of the time and frequency adjustment parameters over each receive beam individually.

e. In uplink BDMA transmission, user terminals apply time and frequency synchronization to the transmit signals based on the estimates of the time and frequency adjustment parameters over each transmit beam individually.

f. Base stations perform beam and user scheduling to select the user terminals that communicate with the base station over the same time/frequency resources and the corresponding transmit and receive beams for each user terminal based on the beam domain channel statistics; the base station beam sets assigned to different scheduled user terminals are mutually non-overlapping.

g. In downlink BDMA transmission, base stations transmit the pilot signals and data signals over the assigned beams for each scheduled user terminal; each scheduled user terminal applies per-beam time and frequency synchronization to the received signal over the receive beams; pilot signals are not required to be orthogonal for different user terminals, and may be reused across different user terminals.

h. In uplink BDMA transmission, the scheduled user terminals apply per-beam time and frequency synchronization to the transmit pilot and data signals over the transmit beams; base stations process the signals over the assigned receive beams; pilot signals sent from different user terminals are not required to be orthogonal, and may be reused across different user terminals.

i. Above described BDMA based massive MIMO wireless transmission is dynamically adjusted when the statistics of the channels between the base stations and the user terminals vary.

It should be noted that the above description of the implementation is merely provided for the purposes of illustration, and not intended to limit the scope of the present disclosure. For persons having ordinary skills in the art, multiple variations or modifications may be made under the teachings of the present disclosure. For example, any one or more of the steps may be omitted, and/or any one or more of the steps may be interchanged. However, those variations and modifications do not depart from the scope of the present disclosure.

In some embodiments, the signal transmitting device may dynamically adjust the above described BDMA based massive MIMO wireless transmission when statistics of the channels between the base stations and the user terminals vary.

The above per-beam time/frequency synchronization method provided in the present disclosure may have the following advantages:

a. The proposed method utilizes the massive MIMO beam domain channel properties to perform per-beam time/frequency synchronization. The proposed method may mitigate the multipath effect and Doppler effect of wireless transmission, improve the performance of wireless transmission, and provide support for wireless transmission in high mobility and high carrier frequency scenarios.

b. Synchronization of the transmission signals in the proposed method may be performed in the beam domain. User terminals may estimate the time and frequency synchronization parameters of each beam individually based on the received synchronization signals sent from the base stations, and perform per-beam time and frequency synchronization to the uplink and downlink transmission signals, respectively.

c. The method may utilize the massive MIMO beam domain channel statistical properties to perform BDMA transmission. Different user terminals may communicate with the base station using mutually non-overlapping base station beam sets. Channel estimation and data transmission of different user terminals may be performed over the corresponding beam resources, which may significantly reduce the transmission complexity. Different user terminals may reuse the pilot signals, which can significantly reduce the pilot overhead.

d. Via adjusting the allowable numbers of transmit and receive beams for different user terminals, the numbers of required radio frequency (RF) chains may be significantly reduced, which may reduce the system energy consumption and realization costs.

To further show the above advantages, below is an exemplary embodiment that implements the massive MIMO wireless transmission method described above.

1. System Configuration

Take a wireless communications system as an example, where each base station is equipped with an antenna array involving several or several dozens of antenna elements. The equipped antenna arrays may be linear arrays, circular arrays or planar arrays, etc. The number of base station antennas is M, a positive integer. The antenna elements may be omnidirectional antennas or directional antennas. When the antenna arrays utilize omnidirectional antenna elements, 120 degree directional antenna elements, or 60 degree directional antenna elements, the corresponding antenna spacing are ½ wavelength, $1/\sqrt{3}$ wavelength, 1 wavelength, respectively. The antenna elements may be single-polarized or multi-polarized.

Each antenna array element may be connected with the digital baseband modules through the respective transmit/receive RF modules, AD/DA modules, digital optical modules, and fiber optic transmission channels. Cell coverage by massive beams may be achieved using the digital or analog or hybrid beamforming networks. Each beam transmit/receive port may be connected with the digital baseband modules through the respective transmit/receive RF modules, AD/DA modules, digital optical modules, and fiber optic transmission channels.

The number of user terminals may be U, the set of the user terminals may be denoted as U={0, 1, . . . , U−1}. Each of the user terminals may be equipped with K antennas. The antenna elements may be omnidirectional antennas or directional antennas. When the antenna arrays utilize omnidirectional antenna elements, 120 degree directional antenna elements, or 60 degree directional antenna elements, the corresponding antenna spacing may be selected as ½ wavelength, $1/\sqrt{3}$ wavelength, 1 wavelength, respectively. The antenna elements may be single-polarized or multi-polarized. CP based OFDM may be adopted for wideband modulation.

2. Massive MIMO Beam Domain Channel Properties

Denote $G_u^{dl}$ (t, f) as the complex baseband downlink antenna domain channel response matrix between the base station and user terminal u at time t and frequency f. The corresponding beam domain channel response matrix may be given by $\overline{G}_u^{dl}$(t, f)=$V_u G_u^{dl}$ (t, f)U, where U may be the fixed matrix which depends on the base station array configurations, $V_u$ may be the fixed matrix which depends on the array configurations of user terminal u. Note that U and $V_u$ may be referred to as base station beamforming matrix and user terminal beamforming matrix, respectively.

For massive MIMO communications systems where both the base stations and user terminals are both equipped with multiple antennas, the corresponding beam domain channels may exhibit new properties. Different beam domain channel elements may be related to the channel gains correspond to different transmit and receive directions. As these different directions may be resolved by large antenna arrays equipped at both the base stations and user terminals, different beam domain channel elements may tend to exhibit statistically uncorrelated properties as follows $$E\left\{\left[\overline{G}_u^{dl}(t,f)\right]_{k,m}\left[\overline{G}_u^{dl}(t,f)\right]_{k',m'}^*\right\} = \begin{cases} [\Omega_u]_{k,m} & k=k', m=m' \\ 0 & \text{else} \end{cases} \quad (1)$$

where $E\{\cdot\}$ denotes the expectation operation, $(\cdot)^*$ denotes the conjugate operation, $[\cdot]_{k,m}$ denotes the matrix element at the kth row and the mth column. Meanwhile, as large antenna arrays may achieve fine division of the channels in the space, fluctuation of the envelopes of the beam domain channel elements across time and frequency may tend to disappear, which indicates that the beam domain channel elements tend to have smaller delay spreads and Doppler spreads compared with the antenna domain channel elements.

3. Per-Beam Time and Frequency Synchronization

The most common synchronization approach for MIMO-OFDM systems may be to compensate for the time/frequency offsets of the received signals in the antenna domain using the same time/frequency adjustment parameters. With such synchronization approaches, the equivalent channel Doppler spreads may be linear with the carrier frequency, which may constitute the system bottleneck. With the above massive MIMO beam domain channel properties, the present disclosure proposes to transform the antenna domain signals into the beam domain and then perform synchronization of the beam domain signals over each beam individually, which may mitigate the channel multi-path effect and Doppler effect.

Figure 7:
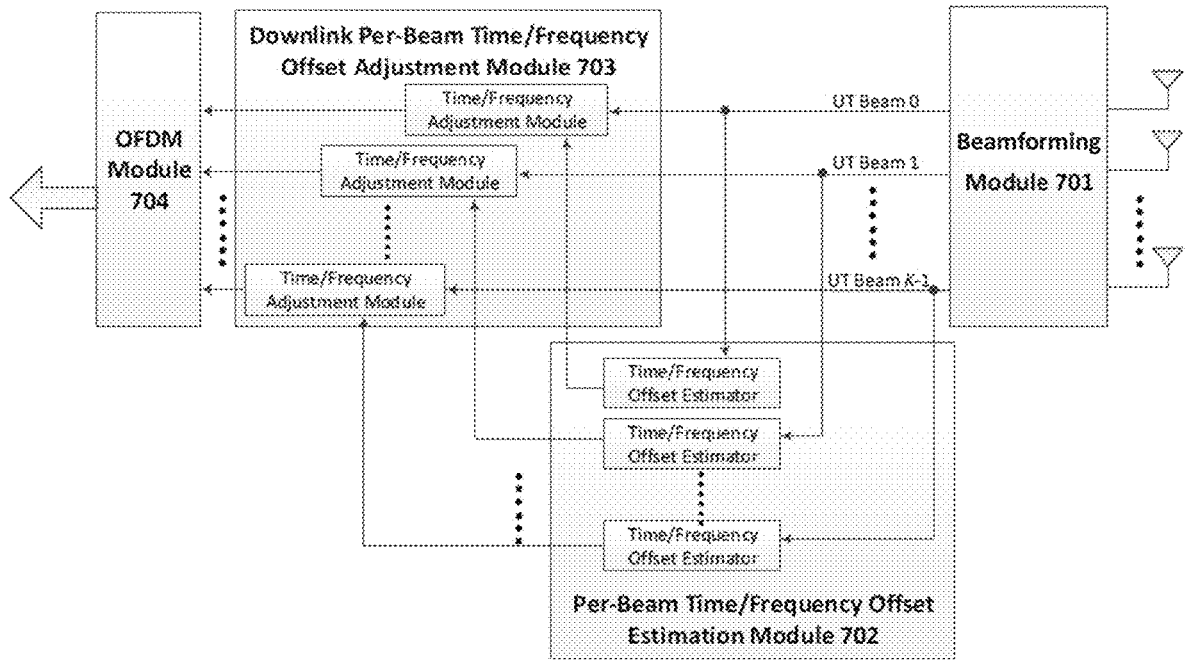
FIG. 7 illustrates a downlink per-beam time/frequency synchronization method according to some embodiments of the present disclosure.

For downlink per-beam time/frequency synchronization as illustrated in FIG. 7, base stations may periodically transmit the synchronization signals to enable the user terminals to estimate the synchronization parameters in the beam domain. Each user terminal may firstly transform the received antenna domain signals into the beam domain using the beamforming module 701, estimate the time and frequency synchronization parameters of each beam individually based on the received synchronization signals using the per-beam time/frequency offset estimation module 702, and then utilize them to apply time and frequency adjustment to the signals in the downlink per-beam time/frequency offset adjustment module 703 over each receive beam, respectively. The synchronized beam domain signals may be further transmitted to the OFDM module 704. The period of transmitting the synchronization signals may depend on the transmission scenarios. The typical period of transmitting the synchronization signals may be several or several dozens of the transmission frame length and the corresponding estimation of the time and frequency synchronization parameters may be performed in a relatively large time scale. Denote $\tau_{u,k}^{syn}$ and $v_{u,k}^{syn}$ as the time synchronization parameter estimate and frequency synchronization parameter estimate of user terminal u over beam k, respectively. Let $y_{u,k}^{dl}$(t) be the received signals of user terminal u over beam k, then with time adjustment $\tau_{u,k}^{syn}$ and frequency adjustment $v_{u,k}^{syn}$ applied to $y_{u,k}^{dl}$(t), the adjusted signal may be given by $$y_{u,k}^{dl,per}(t)=y_{u,k}^{dl}(t+\tau_{u,k}^{syn})\cdot\exp\{-j2\pi(t+\tau_{u,k}^{syn})v_{u,k}^{syn}\} \quad (2)$$

where $j=\sqrt{-1}$.

Figure 8:
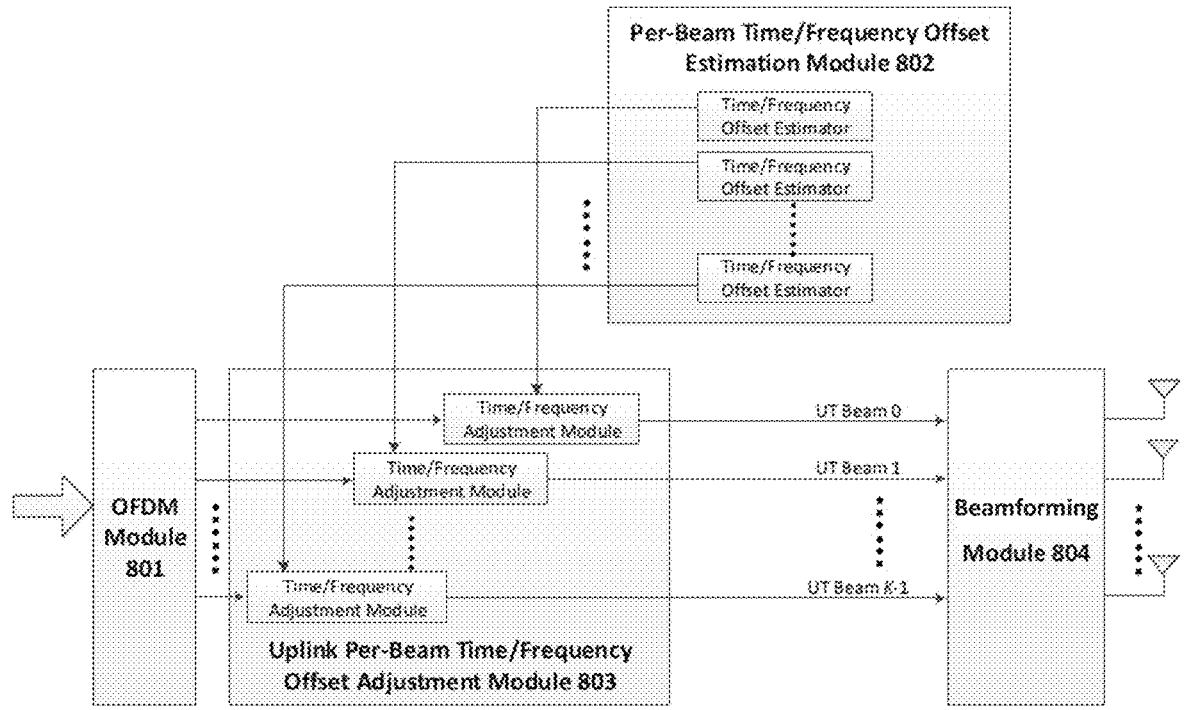
FIG. 8 illustrates an uplink per-beam time/frequency synchronization method according to some embodiments of the present disclosure.

For uplink transmission as illustrated in FIG. 8, user terminals may utilize the estimates of the time and frequency offset parameters over all beams obtained in downlink per-beam time/frequency synchronization to perform uplink per-beam time/frequency synchronization. The beam domain signals may be outputted from the OFDM module 801. Each user terminal then may utilize the estimates of the time and frequency offset parameters obtained in the per-beam time/frequency offset estimation module 802 to apply time and frequency adjustment to the beam domain signals in the uplink per-beam time/frequency offset adjustment module 803, respectively. Finally, the synchronized beam domain signals may be transformed into the antenna domain using the beamforming module 804. Denote $\tau_{u,k}^{syn}$ and $v_{u,k}^{syn}$ as the time synchronization parameter estimate and frequency synchronization parameter estimate of user terminal u over beam k, respectively. Let $x_{u,k}^{ul}$(t) be the signals of user terminal u over beam k to be transmitted, and then with time adjustment $\tau_{u,k}^{syn}$ and frequency adjustment $v_{u,k}^{syn}$ applied to $x_{u,k}^{ul}$ (t), the adjusted signal may be given by $$x_{u,k}^{ul,per}(t)=x_{u,k}^{ul}(t+\tau_{u,k}^{syn})\cdot\exp\{-j2\pi(t+\tau_{u,k}^{syn})v_{u,k}^{syn}\}. \quad (3)$$

4. BDMA Massive MIMO Wireless Transmission with Per-Beam Time/Frequency Synchronization Per-beam synchronization may mitigate the multipath effect and Doppler effect of wireless transmission, and improve the wireless transmission performance. Per-beam synchronization may be embedded into all massive MIMO transmissions. The embodiments of the present disclosure propose a BDMA based massive MIMO wireless transmission method with per-beam synchronization, as illustrated in FIG. 3.

In BDMA based wireless transmission, different user terminals may communicate with the base station using mutually non-overlapping base station beam sets, and the key transmission components are as follows:

1) The base station may acquire the beam domain channel statistics from all user terminals in its own cell. Different user terminals may transmit uplink sounding signals with per-beam time/frequency synchronization. Then the base station may estimate the beam domain channel power matrix $\Omega_u$ based on the received sounding signals from different user terminals. Since the channel statistics may vary much slower than the instantaneous channel state information, the overhead of estimating the channel statistics may be much less than that of estimating instantaneous channel state information.

2) The base station may utilize the estimates of the beam domain channel statistics to perform user and beam scheduling to determine the user terminals that communicate with the base station using the same resource blocks and the corresponding beam resources according to some design criteria and realization restrictions.

3) Take downlink BDMA transmission as an example. Let $P^{dl}$ be the transmit power of frequency domain modulated symbols at the base station; the power may be equally allocated across different transmitting beams. The variance of the noise at the receive side may be denoted as $\sigma^{dl}$, and the downlink signal-to-noise (SNR) may be given by $\rho^{dl} = P^{dl}/\sigma^{dl}$. Let $B_u^{dl,bs}$ and $B_u^{dl,ut}$ be the allocated beam sets at the base station and user terminal, respectively, then the achievable sum rates may be approximately given by $$R^{dl,apr} = \sum_{u=0}^{U-1} \log_2 \frac{\det\left(I + \frac{\rho^{dl}}{\sum_{u'=0}^{U-1}|\mathcal{B}_{u'}^{dl,bs}|} \sum_{u''=0}^{U-1}\sum_{j\in\mathcal{B}_{u''}^{dl,bs}} \text{diag}\{[\Omega_u]_{\mathcal{B}_u^{dl,ut},j}\}\right)}{\det\left(I + \frac{\rho^{dl}}{\sum_{u'=0}^{U-1}|\mathcal{B}_{u'}^{dl,bs}|} \sum_{u''\neq u}\sum_{j\in\mathcal{B}_{u''}^{dl,bs}} \text{diag}\{[\Omega_u]_{\mathcal{B}_u^{dl,ut},j}\}\right)} \quad (4)$$

where $|\beta|$ denotes the cardinality of set $\beta$. The user and beam scheduling in downlink BDMA may be formulated as the following problem:

$$\max_{\{\mathcal{B}_u^{dl,bs},\mathcal{B}_u^{dl,ut}:u\in\mathcal{U}\}} R^{dl,apr} \quad (5)$$

s.t.

$$\mathcal{B}_u^{dl,bs} \cap \mathcal{B}_{u'}^{dl,bs} = \emptyset, \quad \forall u \neq u',$$
$$|\mathcal{B}_u^{dl,bs}| \leq B_u^{dl,bs}, |\mathcal{B}_u^{dl,ut}| \leq B_u^{dl,ut}, \quad \forall u,$$
$$\sum_{u=0}^{U-1}|\mathcal{B}_u^{dl,bs}| \leq B^{dl,bs}$$

where $B_u^{dl,bs}$ and $B_u^{dl,ut}$ denote the maximum allowable numbers of transmit beams and receive beams for user terminal u in downlink transmission, respectively; $B^{dl,bs}$ denotes the maximum allowable number of total base stations beams in downlink transmission. The numbers of maximum allowable beams, $B_u^{dl,bs}$, $B_u^{dl,ul}$, $B^{dl,bs}$, may be adjusted to control the required numbers of RF chains and transmit/receive modules, and reduce the implementation cost.

The user and beam scheduling problem in (5) may be solved using greedy algorithms. With the constraints of allowable numbers of beams and the mutually non-overlapping condition of the beam sets of different user terminals, all user terminals and available beams may be searched in an iterative manner. In each iteration, the user terminals that may maximize the achievable sum rates may be scheduled with the corresponding beams. If the achievable sum rate begins to decrease or all user terminals are exhausted, the algorithm may end and output the solution. The detailed description of the algorithm may be as follows:

---
Downlink greedy beam scheduling algorithm
---

Input: The user terminal set U and the beam domain channel covariance matrices $\{\Omega_u : u \in U\}$
Output: Downlink beam scheduling pattern $\{B_u^{dl,bs}, B_u^{dl,bs} : u \in U\}$ ---
Downlink greedy beam scheduling algorithm
---

1: Initialize $B_u^{dl,bs} = \emptyset$ for all $u \in U$, $S^{temp} = \emptyset$, and $R = 0$
2: Temporarily activate all downlink receive beams: Set $B_u^{dl,ut} = \{0,1,\ldots,K-1\}$ for all u
3: while $|S^{temp}| < MU$ do
4: 　　Search for $\{(u',m')\} = \arg\max_{\{(u,m)\}\notin S^{temp}} \sum_{k=0}^{K-1} [\Omega_u]_{k,m}$, update $B_{u'}^{dl,bs} \leftarrow B_{u'}^{dl,bs} \cup \{m'\}$, and calculate $R_{temp}$ using equation (4)
5: 　　if $R_{temp} > R$ then
6: 　　　Update $R = R_{temp}$
7: 　　　if $\sum_{u=0}^{U-1} |B_u^{dl,bs}| \geq B^{dl,bs}$ then
8: 　　　　Break
9: 　　　end if
10: 　　　if $|B_{u'}^{dl,bs}| \geq B_{u'}^{dl,bs}$ then
11: 　　　　Update $S^{temp} \leftarrow S^{temp} \cup \{(u',m)\}$ for all m
12: 　　　end if
13: 　　　Update $S^{temp} \leftarrow S^{temp} \cup \{(u,m')\}$ for all u
14: 　　else
15: 　　　Update $B_{u'}^{dl,bs} \leftarrow B_{u'}^{dl,bs}\backslash\{m'\}$, and $S^{temp} \leftarrow S^{temp} \cup \{(u',m')\}$
16: 　　end if
17: end while
18: Set $B_u^{dl,ut} = \emptyset$ and $B_u^{uns,ut} = \{0,1,\ldots,K-1\}$ for all u, initialize $u = 0, R = 0$
19: while $u \leq U - 1$ do
20: 　　Select receive beam $k' = \arg\max_{k \in B_u^{uns,ut}} \sum_{m=0}^{M-1} [\Omega_u]_{k,m}$, set $B_u^{uns,ut} \leftarrow B_u^{uns,ut}\backslash\{k'\}$, temporarily update $B_u^{dl,ut} \leftarrow B_u^{dl,ut} \cup \{k'\}$, and calculate $R_{temp}$ using equation (4)
21: 　　if $R_{temp} > R$ then
22: 　　　Update $R = R_{temp}$
23: 　　else
24: 　　　Update $B_u^{dl,ut} \leftarrow B_u^{dl,ut}\backslash\{k'\}$
25: 　　end if
26: 　　if $|B_u^{dl,ut}| \geq B_u^{dl,ut}$ or $|B_u^{uns,ut}| \leq 0$
27: 　　　Update $u \leftarrow u + 1$
28: 　　end if
29: end while
30: Output the downlink beam scheduling pattern 4) After user and beam scheduling, the base station may communicate with the scheduled user terminals using the same resource blocks over mutually non-overlapping base station beam sets to realize BDMA transmission. In downlink BDMA, the base station may communicate with user terminal u with the transmit beam set $\beta_u^{dl,bs}$ and receive beam set $\beta_u^{dl,ut}$. Downlink transmission may include pilot training and data transmission, and the pilot and data signals may be synchronized using per-beam synchronization. In the downlink training phase, the base station may send the pilot and data signals of all user terminals over the respective scheduled beam sets. The downlink pilot sequences of different user terminals may not necessarily be required to be mutually orthogonal. Pilot sequences may be reused across different user terminals. Pilot sequences of the same user terminal over different transmit beams may be orthogonal. Each user terminal may process the pilot as well as data signals received over the respective scheduled beams to estimate the downlink channel state information and the interference covariance matrices, and then performs coherent detection to the downlink data signals.

5) In uplink BDMA transmission, all scheduled user terminals may transmit the signals over the respective allocated uplink transmit beams using the same resource blocks, then the base station may process the signals of the scheduled user terminals received over the respective allocated uplink receive beams. Uplink transmission may include pilot training and data transmission, and the pilot and data signals may be synchronized using per-beam synchronization. In the uplink training phase, all scheduled user terminals may transmit the pilot signals over the respective allocated uplink transmit beams. The uplink pilot sequences of different user terminals may not be required to be mutually orthogonal. Pilot sequences may be reused across different user terminals. Pilot sequences of the same user terminal over different transmit beams may be orthogonal. The base station may process the pilot as well as data signals received over the respective allocated receive beams to estimate the uplink channel state information and the interference covariance matrices, and then perform coherent detection to the uplink data signals.

5. Adjustment of BDMA Transmission with Per-Beam Time/Frequency Synchronization

With the varying of the user terminals, the beam domain channel statistics $\Omega_u$ may also vary. With the updated channel statistics, base stations may dynamically perform the above described user and beam scheduling, form the updated user and beam scheduling pattern, and further perform BDMA based massive MIMO wireless transmission with per-beam time/frequency synchronization. The varying scale of the channel statistics may depend on the transmission scenarios, which may be typically several or several dozens of the transmission frame length and the corresponding estimation of the channel statistics may be performed in a relatively large time scale.

As described above, the present disclosure provides systems and methods to conduct BDMA for massive MIMO transmission with per-beam time/frequency synchronization. In the physically motivated beam domain channel model, when both the numbers of antennas at the base station and user terminals tend to infinity, the beam domain channel fading in time and frequency tends to disappear asymptotically. With this property, the present disclosure provides methods for per-beam synchronization, where signal over each beam of the user terminals is synchronized individually. As a result, both the effective channel delay and Doppler frequency spreads may be approximately reduced by a factor of the number of user terminal antennas in the large array regime with per-beam synchronization compared with the conventional synchronization approaches, which effectively mitigates the severe Doppler effect in high frequency band (e.g., mmW/THz) systems and leads to a significantly reduced CP overhead. The present disclosure further applies the per-beam synchronization method to BDMA. The present disclosure also investigates beam scheduling for both the UL and the DL BDMA, and provides a (suboptimal) greedy beam scheduling algorithm.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties such as molecular weight, reaction conditions, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A signal receiving electronic device, comprising:
   at least one storage medium including a set of instructions for per-beam signal synchronization; and
   at least one processor in communication with the at least one storage medium, wherein when executing the set of instructions, the processor is directed to conduct a wireless communication with a signal transmitting device via beamforming, during which the at least one processor is directed to:
   receive a beam domain signal via a beam set from the signal transmitting device; and
   individually synchronize the beam domain signal in each beam of the beam set, wherein to individually synchronize the beam domain signal, the at least one processor is further directed to, for the beam domain signal of each individual beam of the beam set:
   determine a target frequency adjustment based on frequency offset of the beam domain signal when the beam domain signal is transmitted to the signal receiving device; and
   adjust at least one frequency independent variable of the beam domain signal by the target frequency adjustment,
   wherein the beam domain signal of each beam comprises a plurality of transmission blocks, and wherein to determine the target frequency adjustment, the processor is further directed to:
   for each of the plurality of transmission blocks,
   determine a candidate minimum frequency adjustment as a minimum frequency offset of the beam domain signal induced to the beam;
   determine a candidate maximum frequency adjustment as a maximum frequency offset of the beam domain signal induced to the beam;
   determine a lower bound value of the target frequency adjustment as the minimum of the plurality of the candidate minimum frequency adjustments;
   determine an upper bound value of the target frequency adjustment as the maximum of the plurality of the candidate maximum frequency adjustments; and
   select a value of the target frequency adjustment between the lower bound value and upper bound value.

2. The device of claim 1, wherein to individually synchronize the beam domain signal, the at least one processor is further directed to, for beam domain signal of each individual beam of the beam set:
   determine a target time adjustment based on time shift of the beam domain signal when the beam domain signal is transmitted to the signal receiving device; and
   adjust at least one time independent variable of the beam domain signal by the target time adjustment.

3. The device of claim 2,
   wherein to determine the target time adjustment, the processor is further directed to:
   for each of the plurality of transmission blocks, determine a candidate time adjustment as a minimum time shift of the beam domain signal induced to the beam;
   determine the target time adjustment as the minimum of the plurality of the candidate time adjustment values.

4. The device of claim 1, wherein each beam in the beam set is a millimeter-wave or Terahertz beam associated with a same frequency.

5. The device of claim 1, wherein the plurality of beams comprises a group of mutually non-overlapping beams.

6. The device of claim 1, wherein the wireless communication comprises a massive multiple-input multiple-output transmission.

7. The device of claim 1, wherein the signal of each beam of the beam set comprises data transmission and pilot training, and the pilot training transmitted from the signal transmitting device to different signal receive devices are not mutually orthogonal.

8. The device of claim 1, wherein the beam domain signal comprises data transmission and pilot training,
the first pilot training of a first beam of the beam set and the first pilot training of a second beam of the plurality of beams are mutually orthogonal.

9. A method for per-beam signal synchronization comprising, during wireless communication between a signal transmitting device and a signal receiving device:
receiving, by the signal receiving device, a beam domain signal via a beam set from the signal transmitting device; and
individually synchronizing, by the signal receiving device the beam domain signal in each beam of the beam set, wherein the individually synchronizing of the beam domain signal further comprises, for the beam domain signal of each individual beam of the plurality beams;
determining a target frequency adjustment based on frequency offset of the beam domain signal when the beam domain signal is transmitted to the signal receiving device; and
adjusting at least one frequency independent variable of the beam domain signal by the target frequency adjustment,
wherein the beam domain signal of each beam comprises a plurality of transmission blocks, and wherein the determining of the target frequency adjustment further comprises:
for each of the plurality of transmission blocks,
determining a candidate minimum frequency adjustment as a minimum frequency offset of the beam domain signal induced to the beam;
determining a candidate maximum frequency adjustment as a maximum frequency offset of the beam domain signal induced to the beam;
determining a lower bound value of the target frequency adjustment as the minimum of the plurality of the candidate minimum frequency adjustments;
determining an upper bound value of the target frequency adjustment as the maximum of the plurality of the candidate maximum frequency adjustments; and
selecting a value of the target frequency adjustment between the lower bound value and upper bound value.

10. The method of claim 9, wherein the individually synchronizing of the beam domain signal further comprises, for beam domain signal of each individual beam of the plurality beams:
determining a target time adjustment based on time shift of the beam domain signal when the beam domain signal is transmitted to the signal receiving device; and
adjusting at least one time independent variable of the beam domain signal by the target time adjustment.

11. The method of claim 10,
wherein the determining of the target time adjustment comprises:
for each of the plurality of transmission blocks, determining a candidate time adjustment as a minimum time shift of the beam domain signal induced to the beam;
determining the target time adjustment as the minimum of the plurality of the candidate time adjustment values.

12. The method of claim 9, wherein each of the plurality of beams is a millimeter-wave or Terahertz beam associated with a same frequency.

13. The method of claim 9, wherein the plurality of beams comprises a group of mutually non-overlapping beams.

14. The method of claim 9, wherein the wireless communication comprises a massive multiple-input multiple-output transmission.

15. The method of claim 9, wherein the signal of each beam of the beam set comprises data transmission and at least one first pilot signal for pilot training, and
the at least one first pilot signal is not mutually orthogonal with second pilot signals transmitted from the signal transmitting device to another signal receiving device.

16. The method of claim 9, wherein the signal of each of the plurality beams comprises data transmission and first pilot signal for pilot training,
the first pilot training of a first beam of the beam set and the first pilot training of a second beam of the plurality of beams are mutually orthogonal.

17. A signal transmitting electronic device, comprising:
at least one storage medium including a set of instructions for per-beam signal synchronization; and
at least one processor in communication with the at least one storage medium, wherein when executing the set of instructions, the processor is directed to conduct a wireless communication with a signal receiving device via beamforming, during which the at least one processor is directed to:
determine a beam set to send beam domain signals to the signal receiving device;
for a beam domain signal of each individual beam of the beam set,
individually synchronize the beam domain signal in each beam of the beam set; and
send the beam domain signal to the signal receiving device, wherein to individually synchronize the beam domain signal in each of the plurality of beams, the at least one processor is further directed to:
determine a target frequency adjustment based on frequency offset of the beam domain signal that will be induced when the beam domain signal is transmitted to the signal receiving device; and
adjust at least one frequency independent variable of the beam domain signal by the target frequency adjustment,
wherein the beam domain signal of each beam comprises a plurality of transmission blocks, and wherein to determine the target frequency adjustment, the processor is further directed to:
for each of the plurality of transmission blocks,
determine a candidate minimum frequency adjustment as a minimum frequency offset of the beam domain signal that will be induced to the beam;
determine a candidate maximum frequency adjustment as a maximum frequency offset of the beam domain signal that will be induced to the beam;
determine a lower bound value of the target frequency adjustment as the minimum of the plurality of the candidate minimum frequency adjustments;

determine an upper bound value of the target frequency adjustment as the maximum of the plurality of the candidate maximum frequency adjustments; and select a value of the target frequency adjustment between the lower bound value and upper bound value.

18. The device of claim 17, wherein to individually synchronize the beam domain signal in each of the plurality of beams, the at least one processor is further directed to:

determine a target time adjustment based on time shift of the beam domain signal that will be induced when the beam domain signal is transmitted to the signal receiving device; and adjust at least one time independent variable of the beam domain signal by the target time adjustment.

19. The device of claim 18, wherein to determine the target time adjustment, the processor is further directed to:

for each of the plurality of transmission blocks, determine a candidate time adjustment as a minimum time shift of the beam domain signal that will be induced to the beam;

determine the target time adjustment as the minimum of the plurality of the candidate time adjustment values.

20. The device of claim 17, wherein each of the plurality of beams is a millimeter-wave beam or a Terahertz beam associated with a same predetermined frequency.

21. The device of claim 17, wherein the plurality of beams comprises a group of mutually non-overlapping beams.

22. The device of claim 17, wherein the wireless communication comprises a massive multiple-input multiple-output transmission.

23. The device of claim 17, wherein the signal of each beam of the beam set comprises data transmission and at least one first pilot signal for pilot training, and the at least one first pilot signal is not mutually orthogonal with second pilot signals transmitted from the signal transmitting device to another signal receiving device.

24. The device of claim 17, wherein the signal of each of the plurality beams comprises data transmission and first pilot signal for pilot training, the first pilot training of a first beam of the beam set and the first pilot training of a second beam of the plurality of beams are mutually orthogonal.

25. A method for per-beam signal synchronization comprising, during wireless communication between a signal transmitting device and a signal receiving device:

determine, by the signal transmitting device, a beam set to send beam domain signals to the signal receiving device;

for a beam domain signal of each individual beam of the beam set, individually synchronizing, by the signal transmitting device, the beam domain signal in each beam of the beam set; and sending, by the signal transmitting device, the beam domain signal to the signal receiving device, wherein the individually synchronizing of the beam domain signal in each of the plurality of beams further comprises:

determining a target frequency adjustment based on frequency offset of the beam domain signal that will be induced when the beam domain signal is transmitted to the signal receiving device; and adjusting at least one frequency independent variable of the beam domain signal by the target frequency adjustment, wherein the beam domain signal of each beam comprises a plurality of transmission blocks, and wherein the determining of the target frequency adjustment, the processor is further directed to:

for each of the plurality of transmission blocks, determining a candidate minimum frequency adjustment as a minimum frequency offset of the beam domain signal that will be induced to the beam;

determining a candidate maximum frequency adjustment as a maximum frequency offset of the beam domain signal that will be induced to the beam;

determining a lower bound value of the target frequency adjustment as the minimum of the plurality of the candidate minimum frequency adjustments;

determining an upper bound value of the target frequency adjustment as the maximum of the plurality of the candidate maximum frequency adjustments; and selecting a value of the target frequency adjustment between the lower bound value and upper bound value.

26. The method of claim 25, wherein the individually synchronizing of the beam domain signal in each of the plurality of beams further comprising:

determining a target time adjustment based on time shift of the beam domain signal that will be induced when the beam domain signal is transmitted to the signal receiving device; and adjusting at least one time independent variable of the beam domain signal by the target time adjustment.

27. The method of claim 26, wherein the determining of the target time adjustment further comprises:

for each of the plurality of transmission blocks, determining a candidate time adjustment as a minimum time shift of the beam domain signal that will be induced to the beam;

determining the target time adjustment as the minimum of the plurality of the candidate time adjustment values.

28. The method of claim 25, wherein each of the plurality of beams is a millimeter-wave beam or a Terahertz beam associated with a same predetermined frequency.

29. The method of claim 25, wherein the plurality of beams comprises a group of mutually non-overlapping beams.

30. The method of claim 25, wherein the wireless communication comprises a massive multiple-input multiple-output transmission.

31. The method of claim 25, wherein the signal of each beam of the beam set comprises data transmission and at least one first pilot signal for pilot training, and the at least one first pilot signal is not mutually orthogonal with second pilot signals transmitted from the signal transmitting device to another signal receiving device.

32. The method of claim 25, wherein the signal of each beam of the beam set comprises data transmission and first pilot signal for pilot training, the first pilot training of a first beam of the beam set and the first pilot training of a second beam of the plurality of beams are mutually orthogonal.

33. A beam division multiple access (BDMA) based massive multiple-input multiple-output (MIMO) downlink transmission method with per-beam time/frequency synchronization, comprising:

performing beamforming at both base stations and user terminals by dividing channels in space, wherein both the base stations and the user terminals are equipped with antenna arrays, and wherein the numbers of beams formed at the base stations and the user terminals are several or several dozens;

performing synchronization of transmission signals in BDMA over each beam individually in beam sets of the user terminals, wherein each user terminal estimates the time/frequency adjustment parameters of the signals over each beam individually based on the received synchronization signals sent from the base stations, wherein performing synchronization of the transmission signals in BDMA over each beam individually in the beam sets of the user terminals comprises, for a beam domain signal of each individual beam in the beam sets of the user terminals:

determining a target frequency adjustment based on frequency offset of the beam domain signal when the beam domain signal is transmitted to the user terminals; and adjusting at least one frequency independent variable of the beam domain signal by the target frequency adjustment, wherein the beam domain signal of each beam comprises a plurality of transmission blocks, and wherein the determining of the target frequency adjustment further comprises:

for each of the plurality of transmission blocks, determining a candidate minimum frequency adjustment as a minimum frequency offset of the beam domain signal induced to the beam;

determining a candidate maximum frequency adjustment as a maximum frequency offset of the beam domain signal induced to the beam;

determining a lower bound value of the target frequency adjustment as the minimum of the plurality of the candidate minimum frequency adjustments;

determining an upper bound value of the target frequency adjustment as the maximum of the plurality of the candidate maximum frequency adjustments; and selecting a value of the target frequency adjustment between the lower bound value and upper bound value;

at the user terminals, applying time/frequency synchronization to received signals based on the estimates of the time/frequency adjustment parameters over each receive beam individually;

at the base stations, performing beam and user scheduling to select user terminals that communicate with the base stations over the same time/frequency resources and the corresponding transmit beams for each user terminal based on beam domain channel statistics or partial information, wherein the base station beam sets assigned to different scheduled user terminals are mutually non-overlapping; and from the base stations, transmitting the pilot signals and data signals over the assigned beams for each scheduled user terminal wherein each scheduled user terminal applies per-beam time/frequency synchronization to the received signal over the receive beams; pilot signals are not required to be orthogonal for different user terminals, wherein BDMA based massive MIMO downlink wireless transmission is dynamically adjusted when the statistics or partial information of the channels between the base stations and the user terminals vary.

34. A beam division multiple access (BDMA) based massive multiple-input multiple-output (MIMO) uplink transmission method with per-beam time/frequency synchronization, comprising:

performing beamforming at both base stations and user terminals by dividing channels in space, wherein both the base stations and the user terminals are equipped with antenna arrays, and wherein the numbers of beams formed at the base stations and the user terminals are several or several dozens;

performing synchronization of transmission signals in BDMA over each beam individually in beam sets of the user terminals, wherein each user terminal estimates the time/frequency adjustment parameters of the signals over each beam individually based on the received synchronization signals sent from the base stations, wherein performing synchronization of the transmission signals in BDMA over each beam individually in the beam sets of the user terminals comprises, for a beam domain signal of each individual beam in the beam sets of the user terminals;

determining a target frequency adjustment based on frequency offset of the beam domain signal when the beam domain signal is transmitted to the user terminals; and adjusting at least one frequency independent variable of the beam domain signal by the target frequency adjustment, wherein the beam domain signal of each beam comprises a plurality of transmission blocks, and wherein the determining of the target frequency adjustment further comprises:

for each of the plurality of transmission blocks, determining a candidate minimum frequency adjustment as a minimum frequency offset of the beam domain signal induced to the beam;

determining a candidate maximum frequency adjustment as a maximum frequency offset of the beam domain signal induced to the beam;

determining a lower bound value of the target frequency adjustment as the minimum of the plurality of the candidate minimum frequency adjustments;

determining an upper bound value of the target frequency adjustment as the maximum of the plurality of the candidate maximum frequency adjustments; and selecting a value of the target frequency adjustment between the lower bound value and upper bound value;

at the user terminals, applying time/frequency synchronization to the transmit signals based on the estimates of the time/frequency adjustment parameters over each transmit beam individually;

at the base stations, performing beam and user scheduling to select user terminals that communicate with the base stations over the same time/frequency resources and the corresponding receive beams for each user terminal based on beam domain channel statistics or partial information; and at the selected user terminals, applying per-beam time/frequency synchronization to the transmit pilot and data signals over the transmit beams, wherein the base stations process the signals over the assigned receive beams, and wherein pilot signals sent from different user terminals are not required to be orthogonal, wherein BDMA based massive MIMO uplink wireless transmission is dynamically adjusted when the statistics or partial information of the channels between the base stations and the user terminals vary.

* * * * *